Oct. 18, 1932.  E. C. DUNCAN  1,883,771
COMBINED PLANT DUSTER AND FERTILIZER
Filed Sept. 16, 1931   2 Sheets-Sheet 1
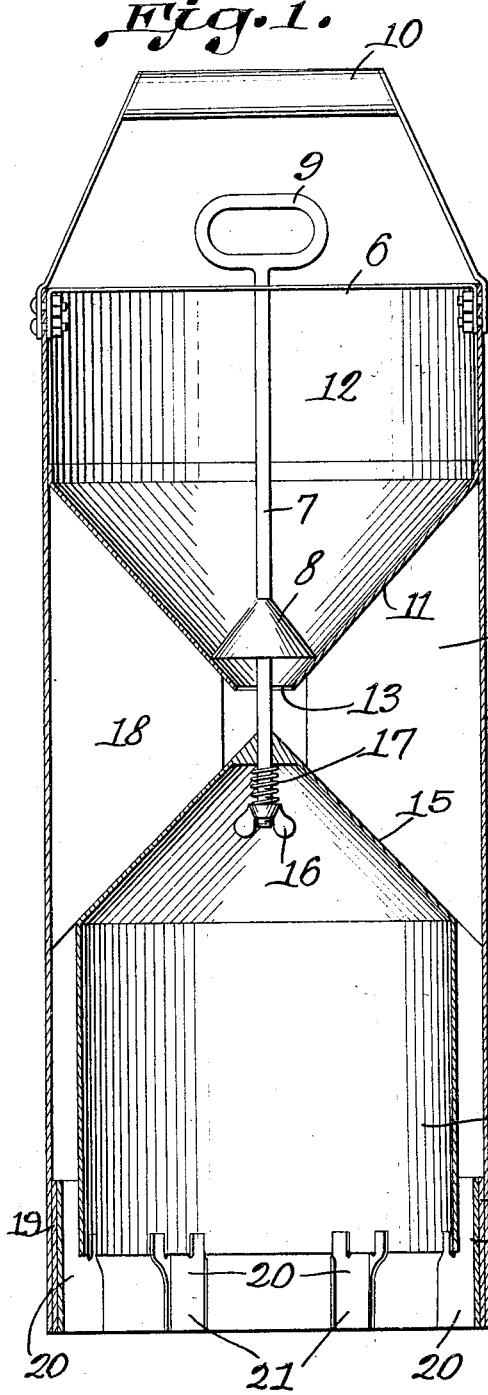
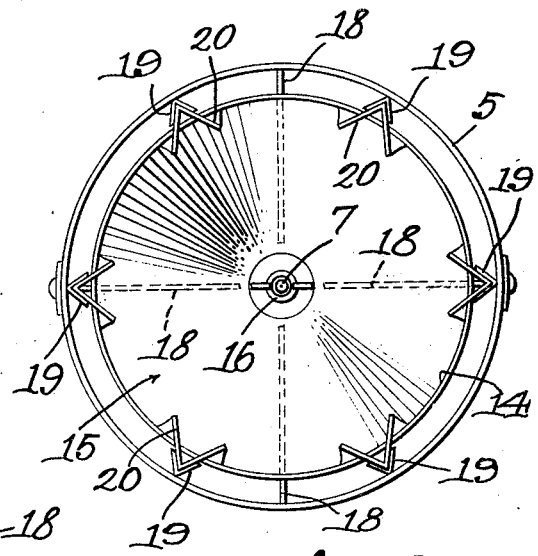
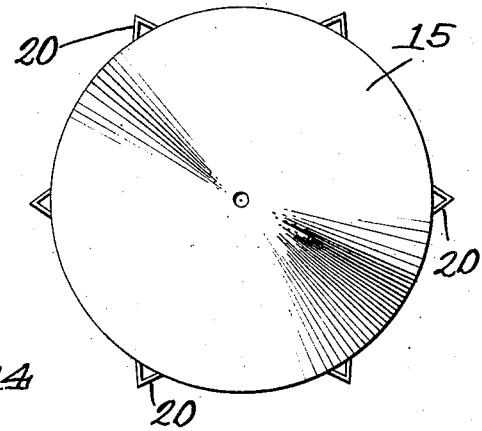
E. C. Duncan, Inventor Oct. 18, 1932.                E. C. DUNCAN                1,883,771
                  COMBINED PLANT DUSTER AND FERTILIZER
                     Filed Sept. 16, 1931    2 Sheets-Sheet 2
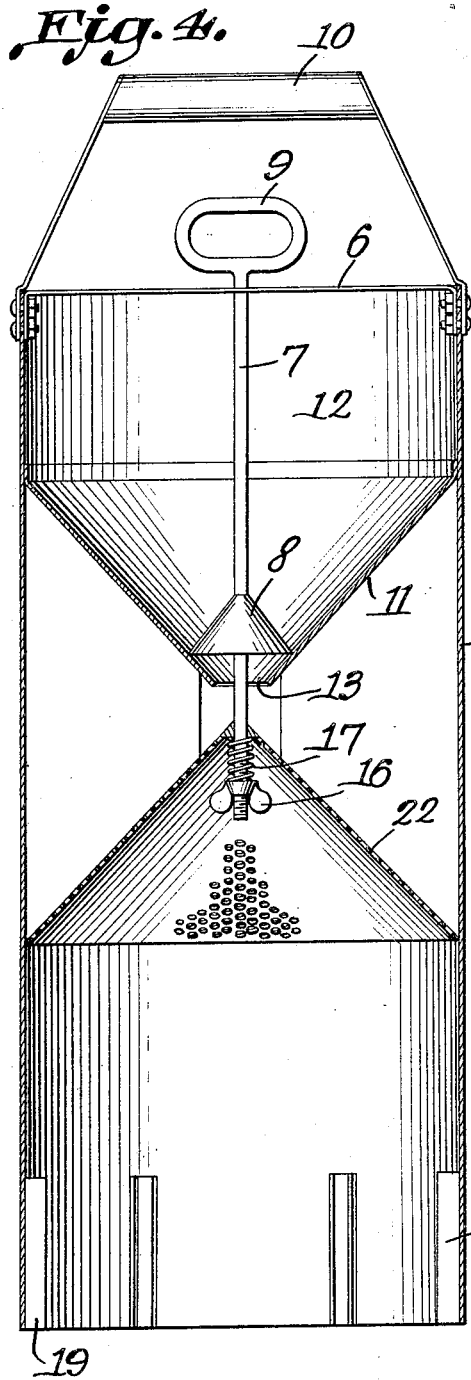
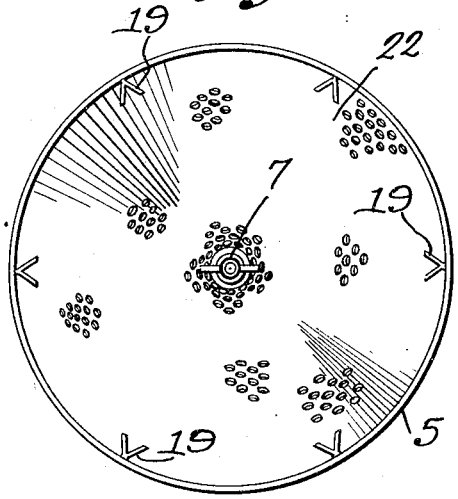
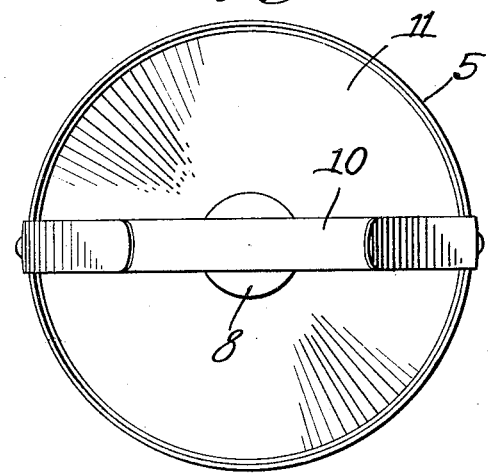
E. C. Duncan, Inventor
By C. A. Snow & Co.
          Attorneys.

Patented Oct. 18, 1932

1,883,771

UNITED STATES PATENT OFFICE

EARL C. DUNCAN, OF ST. ANNE, ILLINOIS

COMBINED PLANT DUSTER AND FERTILIZER

Application filed September 16, 1931. Serial No. 563,187.

This invention relates to a combined fertilizer distributor and insect exterminator, the primary object of the invention being to provide a device of this character which may be readily converted from a device for use in distributing fertilizer, to a device for use in distributing insect powder over plants.

An important object of the invention is to provide a device of this character including a movable agitating member which may be operated to prevent the packing of the material in the container, and to insure the material being distributed over the plants under treatment.

Another object of the invention is to provide means for distributing fertilizer in a circle at the base of a plant, the distributing means having fingers of a construction to mix the fertilizer through the soil to prevent the fertilizer from being blown away.

A still further object of the invention is the provision of a fertilizer distributor which will protect the plants and prevent the fertilizer from being deposited on the plants to injure the plants.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a longitudinal sectional view of a device constructed in accordance with the invention.

Figure 2 is a bottom plan view thereof.

Figure 3 is a plan view of the inner fertilizer distributing member.

Figure 4 is a longitudinal sectional view through the device when used as an insect powder distributor.

Figure 5 is a bottom plan view thereof.

Figure 6 is a plan view of the device.

Referring to the drawings in detail, the reference character 5 designates the body portion of the device, which is in the form of a cylinder, and as shown a bar 6 extends across the upper end of the body portion, the bar being provided with an opening, through which the shank 7 of the valve 8 extends, the shank being provided with a handle 9 at its upper end, by means of which the operator may raise the valve, to permit material to pass from the body portion.

The body portion 5 is carried by means of the handle 10, which is secured at the upper end of the body portion, the handle 10 being so arranged that the handle 9 may be gripped by the operator while holding the handle 10.

As clearly shown by Figure 1 of the drawings, a funnel shaped partitioning member 11 is disposed within the body portion 5, and provides a bottom for the compartment 12, in which the material distributed by the device, is held.

The valve 8 is of a construction to close the open end 13 of the partitioning member 11 under normal conditions, but is so arranged that the material will be fed over the valve 8 and directed to the open end 13, to discharge material from the compartment.

Positioned within the body portion 5, is a cylinder 14 which is formed with a cone shaped end 15, having a central opening through which the shank 7 extends, there being provided a winged nut 16 on the lower end of the shank to secure the cylinder 14 to the shank 7.

Disposed between the winged nut 16 and the cone shaped end 15, is a coiled spring 17 that acts to return the valve to its normal position.

The cylinder 14 is of a diameter less than the diameter of the body portion 5, so that when the cylinder is positioned within the body portion, a passageway is provided between the cylinder 14 and body portion, so that material discharged from the compartment 12, will fall downwardly into the passageway and be deposited at the base of the body portion in a circle.

Plates 18 are secured within the body portion, and have beveled lower edges conforming to the shape of the cone shaped end 15, so that the end 15 may fit against the inclined ends of the plates 18 to restrict movement of the cylinder 14 and insure the proper positioning of the cylinder 14 within the body portion.

Secured within the lower end of the body portion 5, are substantially V shaped guides 19 that cooperate with the correspondingly shaped ribs 20 formed on the cylinder 14, to hold the cylinder 14 against rotary movement within the body portion. The ribs 20, are substantially long, and extend beyond the lower end of the cylinder 14, defining fingers 21.

These fingers are designed for agitating the soil at the point where the fertilizer has been distributed, thoroughly mixing the fertilizer through the soil to prevent the fertilizer from being blown away.

It will be seen that due to this construction, the cylinder 14 will completely house the plant while the fertilizer is being deposited in a circular line near the base of the plant, and the plant is completely protected against the fertilizer being deposited on the plant to injure the same.

In the form of the invention as shown by Figure 4 of the drawings, the cylinder 14 has been removed and a cone shaped member 22 has been positioned in place thereof. This cone shaped member 22 is formed of foraminous material so that the insect powder which is positioned within the compartment 12 in lieu of the fertilizer, may pass through the cone shaped member 22 and be deposited on the plants over which the device is held.

Thus it will be seen that due to this construction, the device may be readily and easily converted from a fertilizer distributor, into an insect powder distributor for killing insects on plants.

The quantity of insect powder is controlled by the valve 8.

Having thus described the invention what is claimed is:

1. A device of the class described comprising a body portion, said body portion having a compartment for containing fertilizer, means for controlling the passage of fertilizer from the compartment, a distributing member positioned within the body portion and onto which the fertilizer passes upon leaving the compartment, means for preventing rotary movement of the distributing member with respect to the body portion, said distributing member being spaced from the body portion to provide an annular passageway, and fingers extending from the distributing member for stirring the ground on which the fertilizer has been deposited.

2. A device of the class described comprising a body portion, a compartment within the body portion, said compartment having a discharge opening, a valve for controlling the discharge of material from the compartment, a distributing member disposed under the compartment, said distributing member having a cone shaped end onto which the material from the compartment is fed, and said distributing member being spaced from the body portion, providing an annular passageway therebetween through which material passes onto the surface being treated.

In testimony that I claim the foregoing as my own, I have hereto affixed my signature.

EARL C. DUNCAN.